US012680678B2

(12) United States Patent
Nelson et al.

(10) Patent No.: US 12,680,678 B2
(45) Date of Patent: Jul. 14, 2026

(54) APPARATUS, METHOD, AND SYSTEM FOR PROVIDING A CONTINUOUS SPRING FORCE ON A HORIZONTALLY AND VERTICALLY MOVABLE DEVICE

(71) Applicant: Lucifer Lighting Company, San Antonio, TX (US)

(72) Inventors: Peter K. Nelson, New Braunfels, TX (US); Brian Beck, Spring Branch, TX (US)

(73) Assignee: Lucifer Lighting Company, San Antonio, TX (US)

( * ) Notice: Subject to any disclaimer, the term of this patent is extended or adjusted under 35 U.S.C. 154(b) by 0 days.

(21) Appl. No.: 19/090,491

(22) Filed: Mar. 26, 2025

(65) Prior Publication Data

US 2025/0314370 A1 Oct. 9, 2025

Related U.S. Application Data

(60) Provisional application No. 63/728,714, filed on Dec. 6, 2024, provisional application No. 63/728,709, filed on Dec. 6, 2024, provisional application No. 63/574,505, filed on Apr. 4, 2024.

(51) Int. Cl.
*F21V 19/04* (2006.01)
*F21S 8/02* (2006.01)
*F21V 21/03* (2006.01)

(52) U.S. Cl.
CPC .............. *F21V 19/04* (2013.01); *F21S 8/026* (2013.01); *F21V 21/03* (2013.01)

(58) Field of Classification Search
CPC ........... F21V 19/04; F21V 21/03; F21S 8/026
See application file for complete search history.

(56) References Cited

U.S. PATENT DOCUMENTS

| | | | | |
|---|---|---|---|---|
| 5,387,066 | A * | 2/1995 | Zekowski | F21V 21/03 174/482 |
| 5,707,143 | A * | 1/1998 | Hentz | F21V 17/164 362/147 |
| 5,758,959 | A * | 6/1998 | Sieczkowski | F21V 25/10 362/288 |
| 6,168,298 | B1 * | 1/2001 | Hentz | F21S 8/02 362/288 |
| 6,183,113 | B1 * | 2/2001 | Waldmann | F21V 17/14 362/288 |
| 6,405,986 | B1 * | 6/2002 | Swadling | H04R 1/028 181/150 |

(Continued)

OTHER PUBLICATIONS

Extended European Search Report dated Sep. 10, 2025 in corresponding European Application No. 25168403.1.

*Primary Examiner* — Christopher E Dunay
(74) *Attorney, Agent, or Firm* — Harness, Dickey & Pierce, P.L.C.

(57) ABSTRACT

A light fixture assembly includes a carriage having a first side wall having a first opening therethrough, and a second side wall disposed opposite and spaced from the first side wall. A light assembly disposed at least partially within and coupled to the first side wall of the carriage. A spring is fixedly coupled to the second side wall extending between the second side wall and the light assembly. The spring is partially compressed by the light assembly while allowing horizontal and vertical movement of at least a portion of the light assembly.

20 Claims, 15 Drawing Sheets

(56) References Cited

U.S. PATENT DOCUMENTS

| | | | | |
|---|---|---|---|---|
| 9,671,091 | B2 | 6/2017 | Jones | |
| 11,754,273 | B2 | 9/2023 | Portinga | |
| 2009/0257219 | A1 | 10/2009 | Doubek | |
| 2011/0261572 | A1 | 10/2011 | Watanabe et al. | |
| 2016/0131317 | A1* | 5/2016 | Doyon | F21V 3/049 362/365 |
| 2021/0388972 | A1 | 12/2021 | Koch et al. | |
| 2023/0288037 | A1 | 9/2023 | Jones et al. | |

* cited by examiner

APPARATUS, METHOD, AND SYSTEM FOR PROVIDING A CONTINUOUS SPRING FORCE ON A HORIZONTALLY AND VERTICALLY MOVABLE DEVICE

CROSS-REFERENCE TO RELATED APPLICATIONS

This application claims the benefit of U.S. Provisional Application No. 63/728,709, filed on Dec. 6, 2024, U.S. Provisional Application No. 63/728,714, filed on Dec. 6, 2024 and U.S. Provisional Application No. 63/574,505, filed on Apr. 4, 2024. The entire disclosures of the above application are incorporated herein by reference.

FIELD

The present disclosure relates to light fixtures, and more particularly, to a light fixture that provides forces to moveable devices therein.

BACKGROUND

This section provides background information related to the present disclosure which is not necessarily prior art.

A light fixture assembly often has a heat sink. Springs are often used on the heat sink to generate resistance to hold the components in place. Often times, multiple springs or other devices are used which must operate simultaneously and equally. Such springs and devices do not easily allow for horizontal travel of the heat sink and therefore the heat sink may be moved at an angle which is undesirable. Another issue with light fixture assemblies is that designers desire smaller and smaller openings for the light. In some cases, designers would like the ceiling surface to be continuous and the light without trim. However, it is often desirable to provide access within the light fixture assembly housing to replace various components such as the LEDs, optics and drivers. Accessing the components is dependent on the removal of the baffle because the baffle apertures have become smaller.

Another issue with light fixture assemblies is that glare may be provided particularly when the apertures for the light have become smaller. Reducing the amount of glare from a light fixture assembly provides a more satisfactory light fixture.

SUMMARY

This section provides a general summary of the disclosure and is not a comprehensive disclosure of its full scope or all of its features.

In one aspect of the disclosure, a light fixture assembly includes a carriage having a first side wall having a first opening therethrough, and a second side wall disposed opposite and spaced from the first side wall. A light assembly disposed at least partially within and coupled to the first side wall of the carriage. A spring is fixedly coupled to the second side wall extending between the second side wall and the light assembly. The spring is partially compressed by the light assembly while allowing horizontal and vertical movement of at least a portion of the light assembly.

In another aspect of the disclosure, a light fixture assembly includes a carriage having a first side wall having a first opening therethrough, and a second side wall disposed opposite and spaced from the first wall. A light assembly is disposed at least partially within and coupled to the first side wall of the carriage. The light assembly has a heat sink. A spring includes a first laterally extending wall fixedly coupled to the second side wall and a second laterally extending wall coupled to the second side wall spaced apart from the second side wall. The spring has a first spring band and a second spring band spaced apart from the first spring band and extending between the first laterally extending wall and the second laterally extending wall. The first spring band and the second spring band are partially compressed by the heat sink while allowing horizontal and vertical movement of the heat sink.

In another aspect of the disclosure, a method for a light fixture assembly having a carriage having at least a first side wall spaced apart from a second side wall includes providing a first laterally extending wall fixedly coupled to the second side wall and a second laterally extending wall extending coupled to the second side wall spaced apart from the second side wall, the spring comprising a first spring band and a second spring band spaced apart from the first spring band and extending between the first laterally extending wall and the second laterally extending wall. The method further includes partially compressing the first spring band and the second spring band by a heat sink, thermally coupling a light engine assembly to the heat sink. The heat sink is at least partially disposed within the housing. The method further includes coupling a baffle to the light fixture assembly.

In another aspect of the disclosure, a light fixture assembly A light fixture assembly includes a baffle having a baffle cylindrical wall extending axially. The baffle includes a baffle end wall with a first opening having a first diameter. A glare mask is disposed adjacent to the baffle end wall. The glare mask has a glare mask aperture wall with a light aperture smaller than the first opening.

In another aspect of the disclosure, a light fixture assembly disposed within a building wall includes a receiver defined by at least one receiver wall defining a receiver opening. The receiver has an interior volume. The at least one receiver wall comprising a flange extending inward. A baffle is formed of a flexible material disposed within the interior volume. The baffle includes at least one baffle perimeter wall extending axially and is disposed within the at least one receiver wall. A cover wall is coupled to and extends between the at least one baffle perimeter wall. The cover wall has an aperture wall extending axially and defining a light aperture. The cover wall includes a first finishing material receiving channel defined around the light aperture. A light engine assembly is coupled within a carriage directing light through the light aperture.

In another aspect of the disclosure, a baffle for a light fixture assembly includes at least one baffle perimeter wall formed of flexible material extending axially. A cover wall is coupled to and extends between the at least one baffle perimeter wall. The cover wall includes an aperture wall extending axially and defining a light aperture. The cover wall includes a first finishing material receiving channel defined around the light aperture.

In another aspect of the disclosure, a method of installing a light fixture includes the steps of installing a light fixture carriage above a ceiling having an opening therein, placing an applique around and within the opening, and inserting at least one perimeter wall of a baffle into a receiver of the applique. The baffle is formed of flexible material and comprising a finishing material receiving channel. The method further includes applying finishing material into the finishing material receiving channel of the baffle.

Other features may include the light fixture assembly where the first side wall may include a bottom side wall. The second side wall may include a top side wall. The spring may include a first end coupled to the top side wall and a second end spaced apart from the second end coupled to the top side wall. The first end may include a first mounting flange and the second end may include a second mounting flange. The first mounting flange and the second mounting flange are coupled to the top side wall by fasteners. The first mounting flange may include a first laterally extending wall extending therefrom and the second mounting flange may include a second laterally extending wall extending therefrom. The first laterally extending wall and the second laterally extending wall may include a first spring band and a second spring band spaced extending therebetween. The first spring band and the second spring band are compressed by the light assembly when the light assembly is assembled within the carriage. The first spring band and the second spring band may include at least an inch long portion contacting the light assembly. The first spring band and the second spring band are compressed by a heat sink of the light assembly when the light assembly is assembled within the carriage. The first spring band and the second spring band are disposed in channels of the heat sink. The first spring band and the second spring band are disposed in longitudinally extending channels of the heat sink. The heat sink may include a plurality of channels, the first spring band received in a first channel of the plurality of channels and the second spring band is received in a second channel of the plurality of channels. The first channel and the second channel a longitudinally extending. The second side wall may include a top side wall and may include fasteners coupling the first laterally extending wall and the second laterally extending wall to the top side wall. The first laterally extending wall, the second laterally extending wall, the first spring band and the second spring band are monolithic.

The method may include removing a baffle from the carriage, and moving the heat sink with a horizontal and vertical movement within the carriage against a spring force proved by the first spring band and the second spring band. The glare mask is disposed within the baffle and the glare mask aperture is defined by a light aperture wall extending axially from a glare mask end wall and extending into the first opening. The light aperture wall may include a matte black finish and the baffle has another finish different than the black finish. The glare mask may include a glare mask cylindrical wall extending axially from the glare mask end wall. The glare mask cylindrical wall is adjacent to the baffle cylindrical wall. The baffle cylindrical wall may include a first fastener opening receiving a first fastener. The first fastener opening is radially disposed through the baffle cylindrical wall. The baffle cylindrical wall may include a second fastener opening receiving a second fastener. The first fastener has a first end surface contacting the glare mask cylindrical wall. The first fastener has a second end surface disposed within the fastener opening. The baffle cylindrical wall may include an o-ring channel on an outer surface thereof, the o-ring channel receiving an o-ring.

The light fixture assembly may include a light engine assembly, the light engine assembly generating light having a focal point within the glare mask aperture wall. The glare mask is disposed adjacent to an inward end of the baffle cylindrical wall. The baffle cylindrical wall is tapered to have a first diameter adjacent the glare mask and a second diameter greater than the first diameter at an outward end of the baffle. The glare mask may include a first fastener opening, the inward end may include a first fastener opening, the first fastener opening of the glare mask and the first fastener opening of the inward end receiving a first fastener. The glare mask may include a second fastener opening, the inward end may include a second fastener opening, the second fastener opening of the glare mask and the second fastener opening of the inward end receiving a second fastener. The glare mask has a first outer diameter equal to a second outer diameter of the baffle. The glare mask may include a light aperture wall may include a matte black finish. The light fixture assembly may include a carriage receiving the baffle.

The light fixture assembly may include a light engine assembly disposed adjacent to the baffle at least partially within the carriage. The at least one baffle perimeter wall may include a seal channel disposed therein, the seal channel receiving a seal disposed therein, the seal directly adjacent to the at least one receiver wall. The aperture wall partially forms the first finishing material receiving channel. The aperture wall may include an outer edge. The outer edge is circular or square. The outer edge is disposed in a first plane. The first finishing material receiving channel may include a first planar wall disposed in a second plane axially inward from the first plane. The first planar wall is concentric with the aperture. The first finishing material receiving channel is defined between the aperture wall and a first axially extending channel wall. The cover wall may include a second finishing material receiving channel disposed adjacent to the first finished material receiving channel. The second finishing material receiving channel may include a second planar wall disposed in a third plane axially inward from the second plane. The second finishing material receiving channel is defined between a first axially extending wall and a second axially extending wall. The first axially extending wall and the second axially extending wall are circular. The at least one baffle perimeter wall may include a four walls. The building wall may include a ceiling. The receiver is formed within an applique. The applique may include a planar portion having perforations therethrough, the planar portion disposed adjacent to the building wall. The at least one baffle perimeter wall is cylindrical. Placing the applique may include placing a planar portion of the applique directly adjacent to the ceiling and may include applying the finishing material over perforations in the planar portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
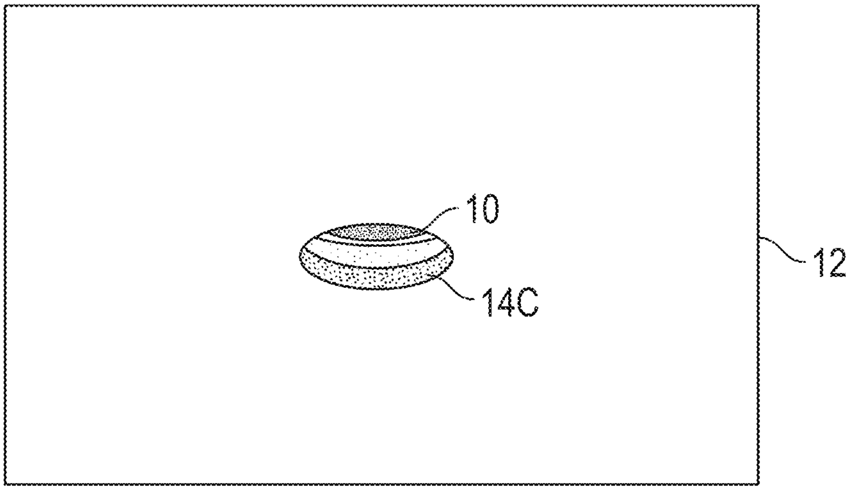
FIG. 1A is a view of a ceiling having a light fixture assembly having a circular light aperture.
Figure 1B:
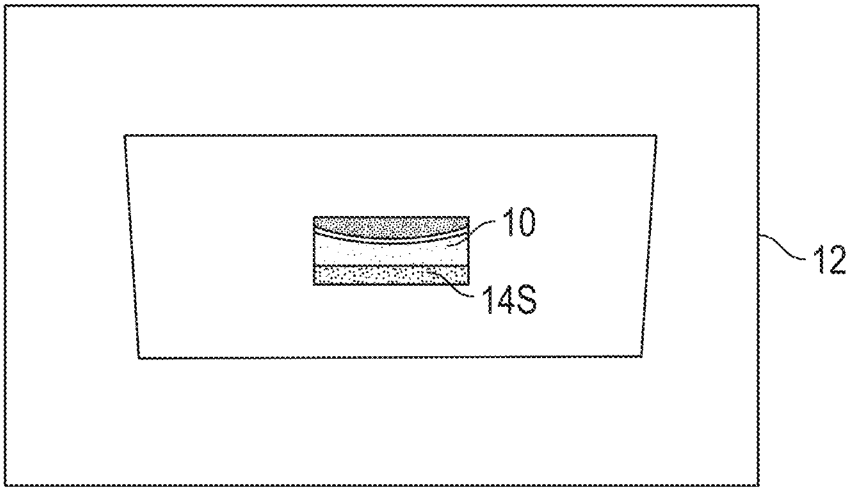
FIG. 1B is a view of a light fixture assembly having trim around a square light aperture.

Referring now to FIGS. 1A and 1B, a light fixture assembly 10 is illustrated in a recessed position. While the light fixture assembly 10 may be recessed within a wall, the present example shows the light fixture as a down light and is recessed behind a ceiling 12. In the present example, FIG. 1A is a trimless design with a circular light aperture 14C. The light aperture 14C in FIG. 1A is circular. A light aperture 14S in FIG. 1B is square. However, the light apertures 14C, 14S whether with or without trim may be various geometrical shapes such as regular or irregular polygons.

In FIG. 1B, a design with a square trim piece 16 that is exposed relative to the ceiling 12 is set forth. The light aperture 14 in a trimmed system may also be various sizes and shapes including regular or irregular polygons, circles and the like. Details of the light aperture 14 and the baffles of the light fixture assembly 10 are set forth in greater detail below.

Adjacent to the light fixture assembly 10, the longitudinal axis 18A, the lateral axis 18B and the vertical axis 18C of the light fixture assembly 10 are represented. The heat sink, as described below, may move in a vertical direction as illustrated by the vertical axis 18C and the longitudinal direction as defined by the longitudinal axis 18A.

Figure 2A:
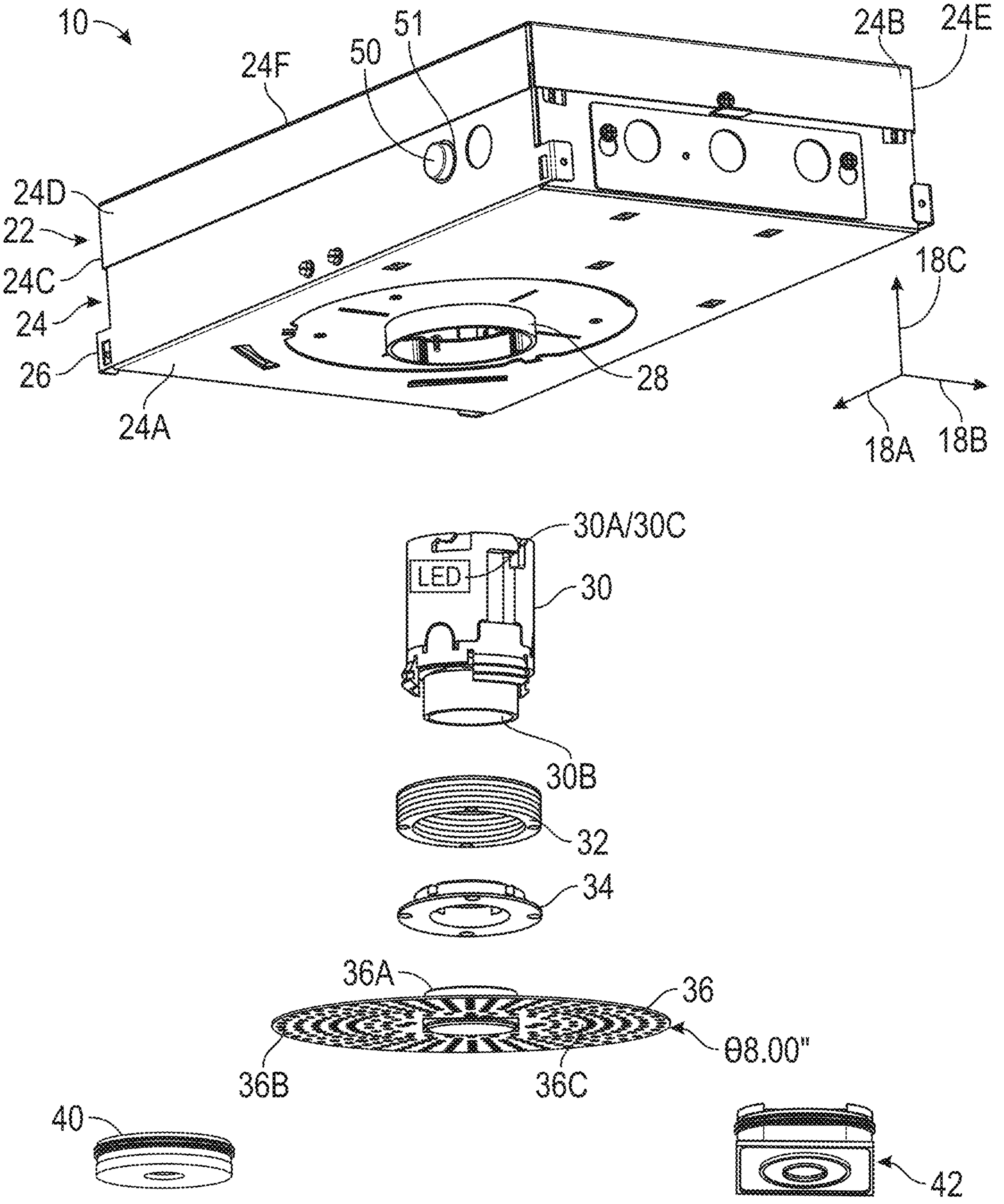
FIG. 2A is an exploded perspective view of a carriage relative to components of the light fixture assembly.

Referring now to FIG. 2A, the light fixture assembly 10 is illustrated. The light fixture assembly 10 has a carriage 22 that is formed from a plurality of side walls. In this example the carriage 22 may be referred to as a housing. In the present example, there are six side walls that include a bottom side wall 24A, lateral side walls 24B and 24C, longitudinal side walls 24D and 24E. Side walls 24B-24E are perpendicular to the bottom side wall 24A. A top side wall 24F may also be provided perpendicular to side walls 24B-24E. The top side wall 24F is opposite and parallel to the bottom side wall 24A. The carriage 22 in the present example forms a rectangular prism that is hollow and used to store various components as described below. Other shapes with various numbers and compositions of side walls may be used.

In the present example, brackets 26 may be coupled to the lateral side walls 24B and 24C and/or the longitudinal side walls 24D and 24E. The brackets 26 may be used to couple the carriage 22 to structures within a building.

The carriage 22 and the bottom side wall 24A a collar 28. The collar 28 is cylindrical and may be formed integral with the bottom side wall 24A.

A light engine assembly 30 is received within the bottom side wall 24A within the collar 28. Of course, the collar 28 may be an optional feature. Likewise, other features set forth relative to FIG. 2A may be optional features.

The light engine assembly 30 has LEDs 30A and optics 30B that are used to generate and redirect light as desired. Various numbers of LEDs with various amounts of lumen output may be provided to the optics 30B. Drivers 30C may also be included within the light engine assembly 30. The drivers 30C are used to power the LEDs 30A. Of course, other types of light sources may be used.

The light fixture assembly 10 may also include spacers 32, several of which are illustrated. The use and number of spacers 32 may vary depending on the geometry of the system and the thickness of the various materials such as the ceiling. In the present example, five ⅛ inch spacers are provided. Also, one 1/16 inch spacers are provided.

Figure 6A:
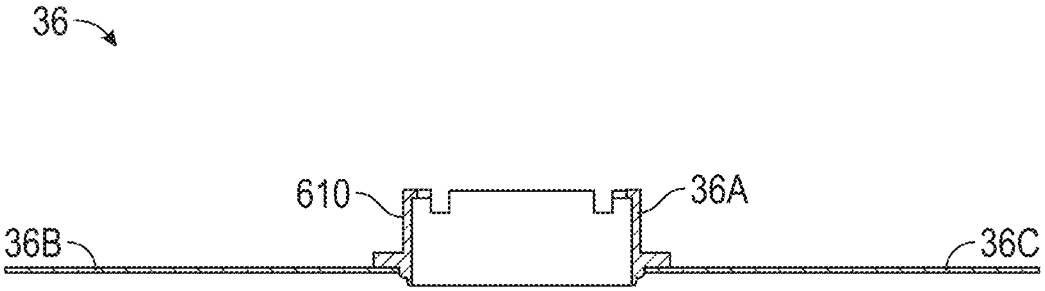
FIG. 6A is a cross-sectional view of a square appliqué.

An appliqué 36 is set forth. In this example, the appliqué 36 has a receiver 36A, a planar portion 36B and perforations 36C that are dispersed through the planar portion 36B. Details and a section view are illustrated in FIG. 6A below. In this example, the receiver 36A is cylindrical. However, other shapes such as square may be used.

The light fixture assembly 10 may also include different types of baffles depending upon the design considerations. A first baffle assembly 40 may be received within the light fixture assembly 10 and the appliqué 36. Details of alternate baffles 40 and 40' are illustrated in FIGS. 4A-5D. Another type of baffle assembly 42 is also illustrated. The baffle assembly 42 is removable and is used to receive finishing materials such as plaster or drywall mud so that the baffle 42 is concealed as illustrated in FIG. 1A. The baffle assembly 42 is described in greater detail in FIGS. 6A-6E.

Figure 2B:
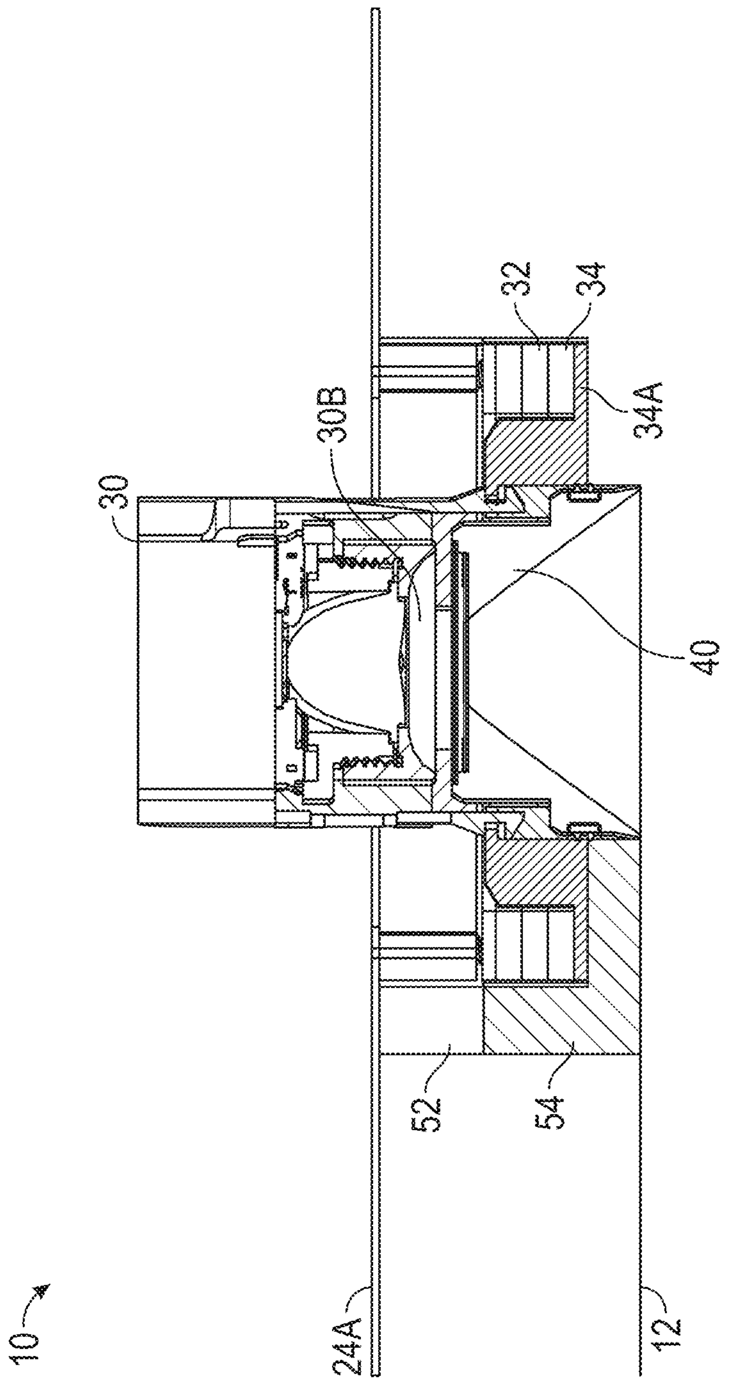
FIG. 2B is a cross-sectional view of one example of a light fixture assembly having a spacer and an adaptor.

Referring now to FIG. 2B, a cross-sectional view of a portion of a light fixture assembly 10 is illustrated. In this example, the light engine assembly 30 is illustrated relative to a baffle assembly 40. The spacers 32 are illustrated relative to the adaptor 34. As is illustrated, the adaptor 34 has a flange 34A on which the spacers 32 rest. A backing 52 and finished millwork 54 are illustrated. In this example, the thickness of the backing 52 and the millwork 54 may be concealed by plaster, mud or other ceiling materials at the ceiling 12. Details of the baffle assembly 40, 40' are described in FIGS. 4A-4B and 5A-5D below.

The carriage 22 may have a sensor assembly 50 that partially extends therefrom. The sensor assembly 50, in this example, extends from the longitudinal side wall 24D. However, any one of the side walls 24A-24F may include the sensor assembly 50 extending therefrom. The sensor assembly 50 extends from an opening 51 through the side wall 24D. Because the walls 24A-24F may be made of metal, the opening 51 allows RF signals to be communicated to and from the sensor assembly.

Figure 3A:
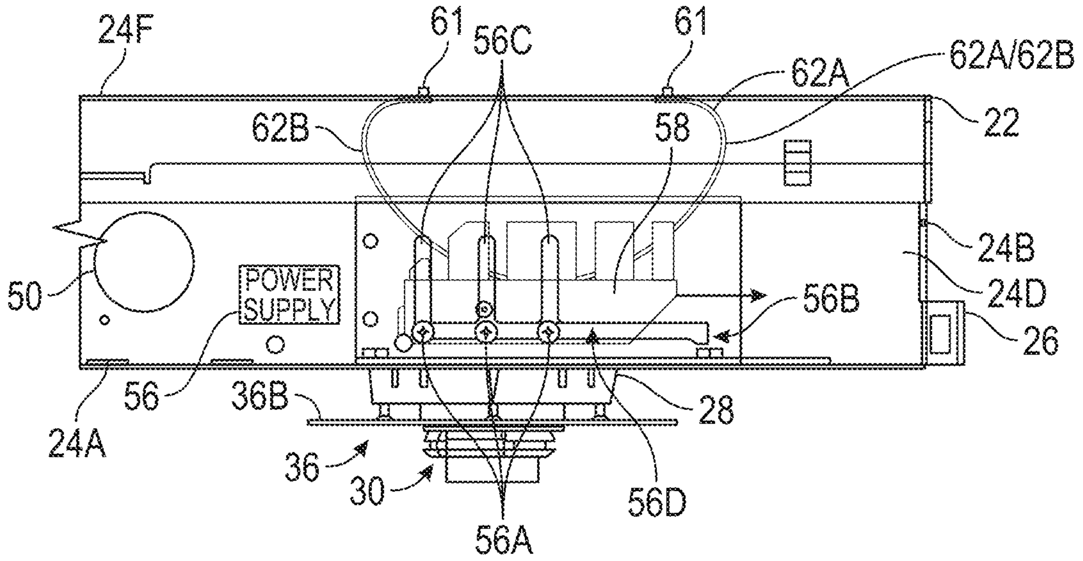
FIG. 3A is a side view of a spring retention for a light fixture assembly.
Figure 3B:
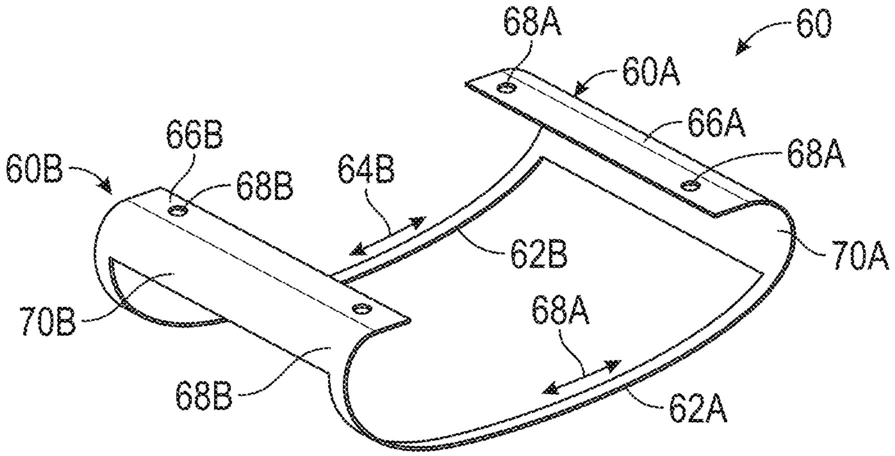
FIG. 3B is a perspective view of the spring of FIG. 3A.
Figure 3C:
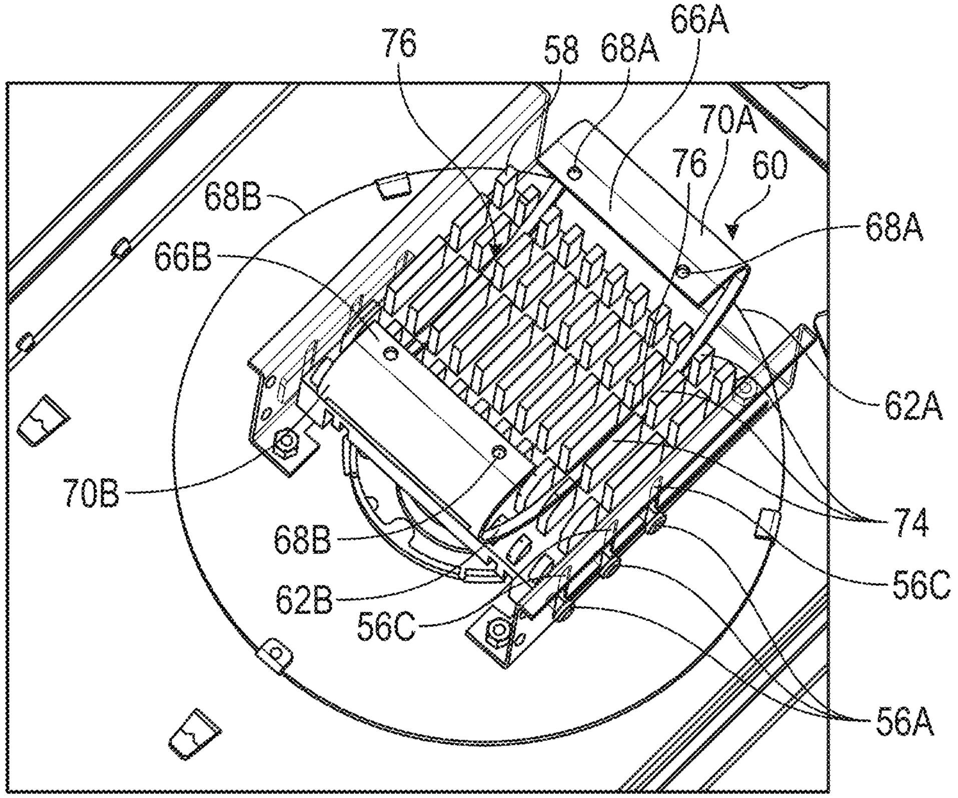
FIG. 3C is a top view of partially moved heat sink assembly relative to the spring with the top side wall removed.
Figure 3D:
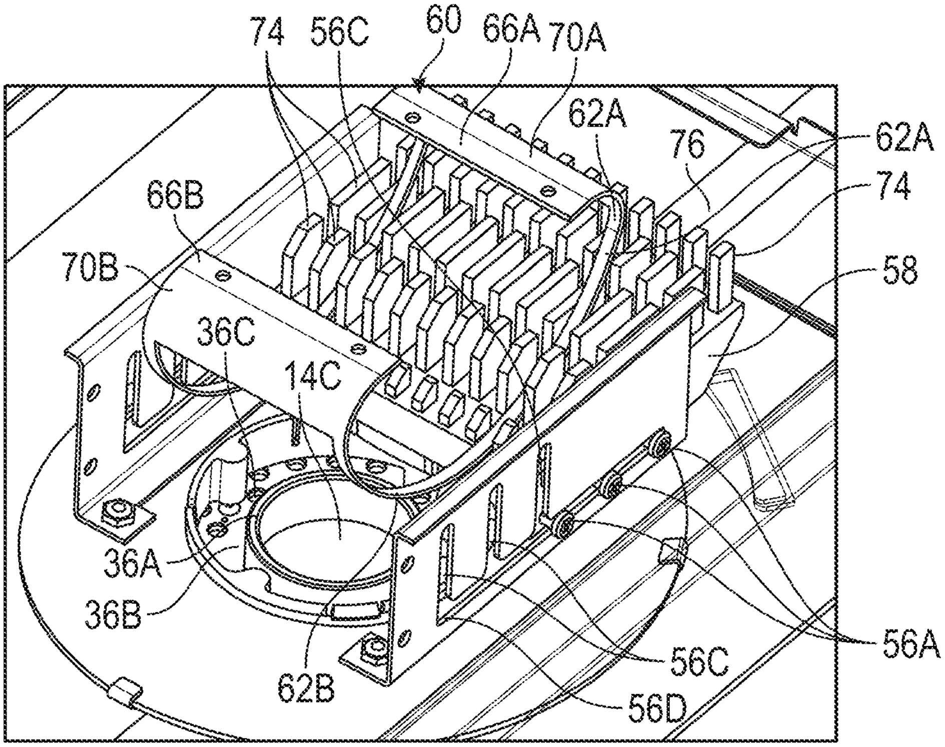
FIG. 3D is a heat sink moved in a longitudinal position with the top side wall removed.

Referring now to FIGS. 3A-3D, an interior view of the carriage 22 with the top side wall 24F is set forth. The sensor 50 disposed on a side wall 24D and a power supply 56 disposed within the carriage 22 are illustrated. In this example, the side walls 24A, 24B, 24D and 24F are illustrated. The heat sink 58 is illustrated in a first position where the light engine assembly 30 is in operation in FIG. 3A. No baffle is illustrated in FIG. 3A. The heat sink 58 is positioned above the light engine assembly 30 to dissipate heat therefrom in this example. However, in FIGS. 3C and 3D, the heat sink 58 is moved away from the light aperture 14C into which the light from the light engine assembly 30 is coupled. This allows a technician's hand enough clearance within the carriage 22 to reach the components such as the sensor assembly 50. The heat sink 58 has extensions 56A that are received in a guide 56B. The guide 56B has vertical portions 56C and horizontal portion 56D disposed perpendicularly in this example. Three vertical portions 56C are illustrated. In FIG. 3D, the heat sink 58 is moved to the right. The extensions 56A are guided downward with the heat sink 58 and into the horizontal portion 56D and in a longitudinal direction. The guide 56D restricts the movement of the heat sink 58.

In the present example, the heat sink 58 has a position that is maintained by a spring 60. The interaction of the spring 60 and the heat sink 58 allow the heat sink 58 to be moved out of the way with resistance as illustrated in FIGS. 3C and 3D. The spring 60 also assists in moving the heat sink 58 into position. In the present example, both vertical and longitudinal movement of the heat sink 58 relative to the carriage 22 may be provided.

As is best illustrated in FIG. 3A, the spring 60 is fixedly coupled to the top side wall 24F with a plurality of fasteners 61. The spring 60, as illustrated best in FIG. 3B, includes a first end 60A and a second end 60B. A first spring band 62A and a second spring band 62B extend between the first end 60A and the second end 60B. Of course, more spring bands may be used depending on the amount of force needed. The spring bands 62A and 62B are partially compressed by the heat sink 58 when the heat sink 58 is assembled within the light fixture assembly 10 and the carriage 22. At least a portion 64A, 64B of the spring bands 62A and 62B contacts the heat sink 58. In the present example, at least one inch segment of the first spring band 62A and a portion 64B of the second spring band 62B contact an upper surface of the heat sink 58.

A mounting flange 66A and a mounting flange 66B are laterally positioned relative to the carriage 22. The mounting flanges 66 are positioned against the top side wall 24F and are mounted thereto using the fasteners 61 that are coupled through the fastener openings 68A and 68B within the mounting flanges 66A and 66B, respectively. In the present example, a laterally extending wall 70A and 70B extend from the mounting flanges 66A and 66B, respectively. The laterally extending walls 70A, 70B are laterally extending relative to the carriage 22. The spring bands 62A and 62B may extend between the laterally extending walls 70A, 70B.

The spring 60 may be a monolithic structure meaning that the spring bands 62A, 62B, the mounting flanges 66A, 66B and the laterally extending walls 70A, 70B may be one integral structure. The spring 60 may be formed from various materials including polymers and metal.

Referring now specifically to FIGS. 3C and 3D, the heat sink 58 is illustrated in greater detail. In this example, the heat sink 58 have a plurality of heat sink extensions 74 that are used to dissipate heat. The heat sink extensions 74 form channels 76 therebetween that extend in a longitudinal direction relative to the carriage 22. The spring bands 62A, 62B are received in different channels 76. The spring 60 is compressible and allows the heat sink 58 to be moved in a vertical direction as well as a longitudinal direction. In FIG. 3C, the heat sink 58 is moved partially longitudinally to the right. In FIG. 3D, the heat sink 58 is moved entirely out of the way of the light aperture 14C. The spring 60 allows a force to be exerted against the heat sink 58 in the horizontal direction of travel. Once the heat sink 58 has moved a predetermined amount, the spring helps move the heat sink without further human intervention. The return of the heat sink 58 over the light aperture 14C is also assisted by the spring 60. That is, when the spring force is applied to the heat sink 58, when force is applied to replace the heat sink 58 into its initial position, travel will be assisted by the spring 60.

In operation, the spring bands 62A, 62B are flexible and extend from the laterally extending walls 70. The spring bands 62A, 62B are partially compressed in an at rest position so a portion of each spring band contacts a surface of the heat sink 58. However, when the spring bands are partially compressed due to movement of the heat sink 58, the spring bands 62A, 62B resist movement in the vertical direction while assisting movement in the longitudinal direction relative to the carriage 22. The light engine assembly 30 is firmly coupled to the heat sink 58 in the at rest position. The components may be serviced, switched or exchanged. The sink 58 is moved in a horizontal and vertical movement guided by the channels 76 formed by the heat sink extensions 74.

Figure 3E:
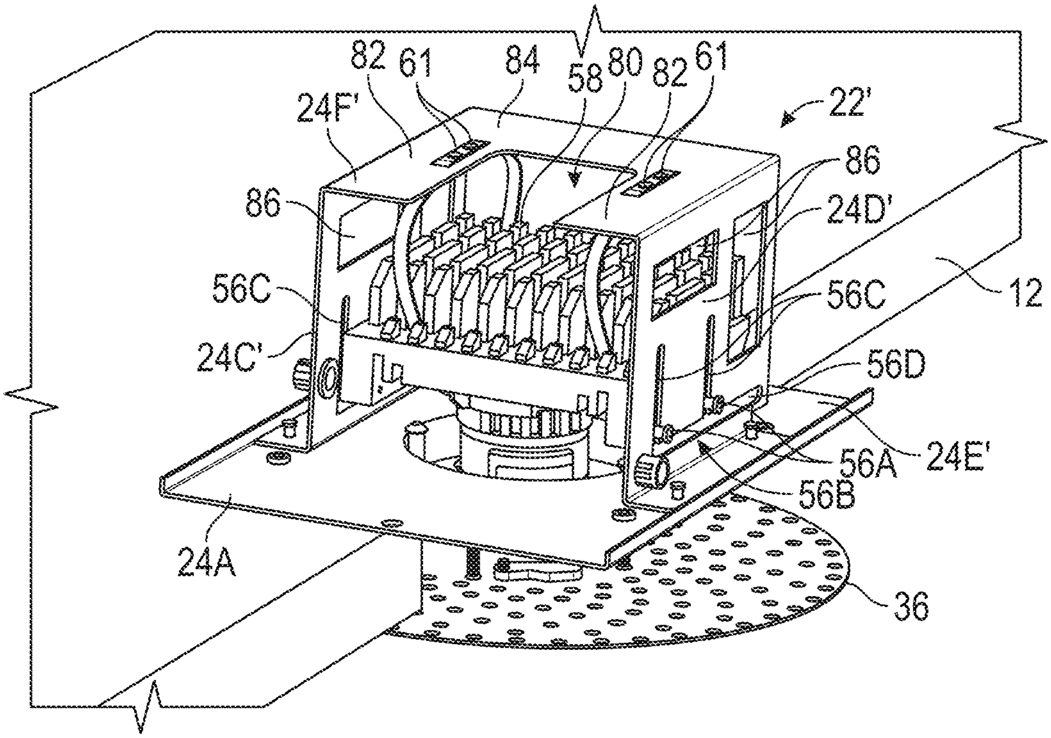
FIG. 3E is a top and side perspective view of a light fixture with an alternative carriage.
Figure 3F:
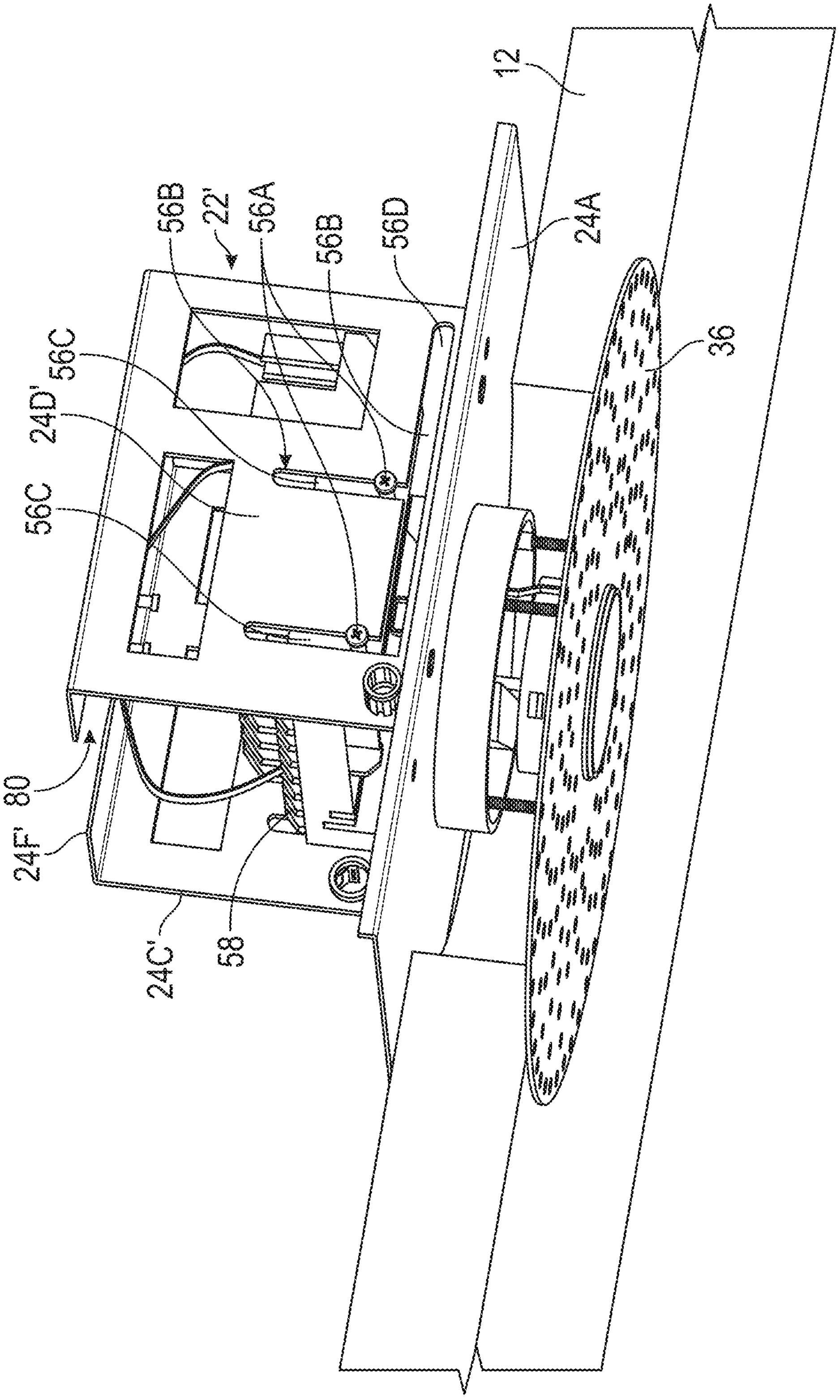
FIG. 3F is a bottom and side perspective view of the light fixture with the alternative carriage of FIG. 3E.

Referring now to FIGS. 3E and 3F, a different configuration of carriage 22' is used to secure the spring 60 within the carriage 22'. The spring 62 is configured the same as described above except that the spring 62 is coupled to the modified top side 24F' that has a rectangular opening or cutout 80. The top side 24F' also has longitudinally extending portion 82 and laterally extending sides 84. Longitudinal sides 24D' and 24C' may be discontinuous and have openings 86 therethrough. No lateral sides may be present in the carriage 22'. In this example only two vertical portions 56C of the guide 56B are used. To move the heat sink 58, the extensions 56B move downward and rightward longitudinally within the horizontal portion 56D.

Figure 4A:
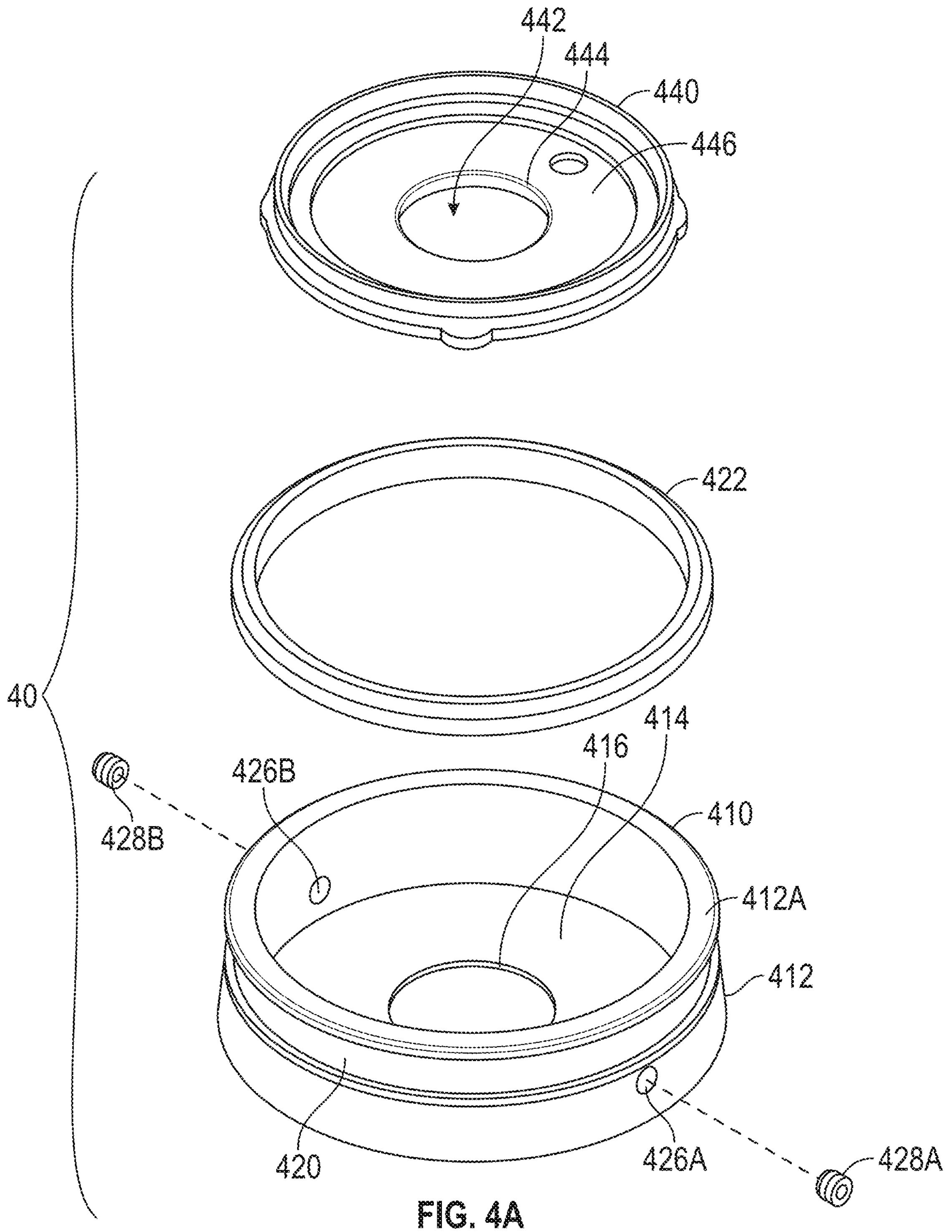
FIG. 4A is an exploded view of one example of a baffle.
Figure 4B:
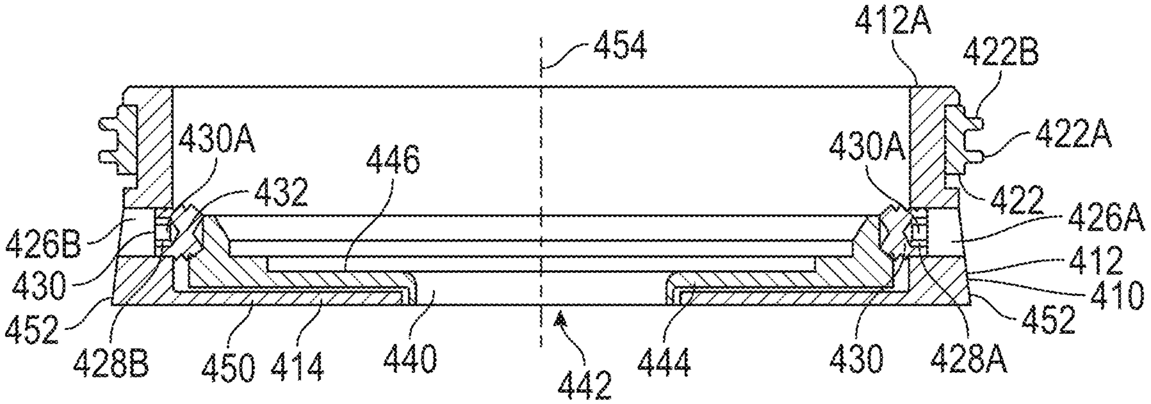
FIG. 4B is a cross-sectional view of the baffle of FIG. 4A.

Referring now to FIGS. 4A and 4B, the baffle assembly 40 includes a baffle 410. The baffle 410 is formed from generally cylindrical walls 412 and a baffle end wall 414. The baffle end wall 414 has an opening 416. The baffle end wall 414 forms an end of the cylinder from by the cylinder walls 412. The baffle end wall 414 is disposed outward from the light fixture assembly 10 relative to the carriage 22. That is, an upper edge 412A of the cylindrical walls 412 is inserted into the carriage 22 and may be inserted into the collar 28.

The baffle 410 has a seal channel 420 that is used for receiving an O ring 422. The seal 420 is generally rectangular in shape and receives the O ring 422 to allow the baffle to seal within the collar 28. The O ring, as best illustrated in FIG. 4B, has a first extension 422A and 422B that help provide a seal to allow the baffle 410 to be maintained in its position during operation. The cylindrical wall 412 includes a first fastener opening 426A and a second fastener opening 426B. The fastener opening 426A and 426B receive a fastener 428A and 428B. The fasteners openings 426A and 426B, as well as the fasteners 428A and 428B, extend in a radially inward direction. A first end 430 of the fasteners 428A, 428B may have a slot or opening 430A for receiving an Allen wrench. The first surface 430 of the fasteners may be recessed within the fastener openings 426A and 426B when the fasteners are used to couple a glare mask 440 within the baffle 410. A second end 432 of the baffle 410 contacts and secures the glare mask 440.

The glare mask 440 has a light aperture 442 therethrough. The light aperture 442, in this example, is formed by a light aperture wall 444. The light aperture wall 444 extends in an axial direction. The surface of the light aperture wall 444 may be colored black, such as by black matte paint. By providing the light aperture wall 444 of a first color reflections from the light source minimized and therefore glare is minimized. The glare mask 440 has a glare mask aperture wall 446 that has the aperture 442 therethrough. The aperture 442 has a smaller diameter than the opening 416.

The baffle 410 and the finished surface 450 of the end wall 414 may be coated with or formed of a material that has a different color than the black matte finish of the light aperture walls 444. This allows improved choices from a design perspective.

Although the cylindrical walls 412 are illustrated on the inside as cylindrical with walls parallel to the axis 454, an angle portion 452 toward the outward most position by the end wall 414 may be angled outward away from the axis 454. This allows a tight fit when the baffle is mounted to the light.

Figure 5A:
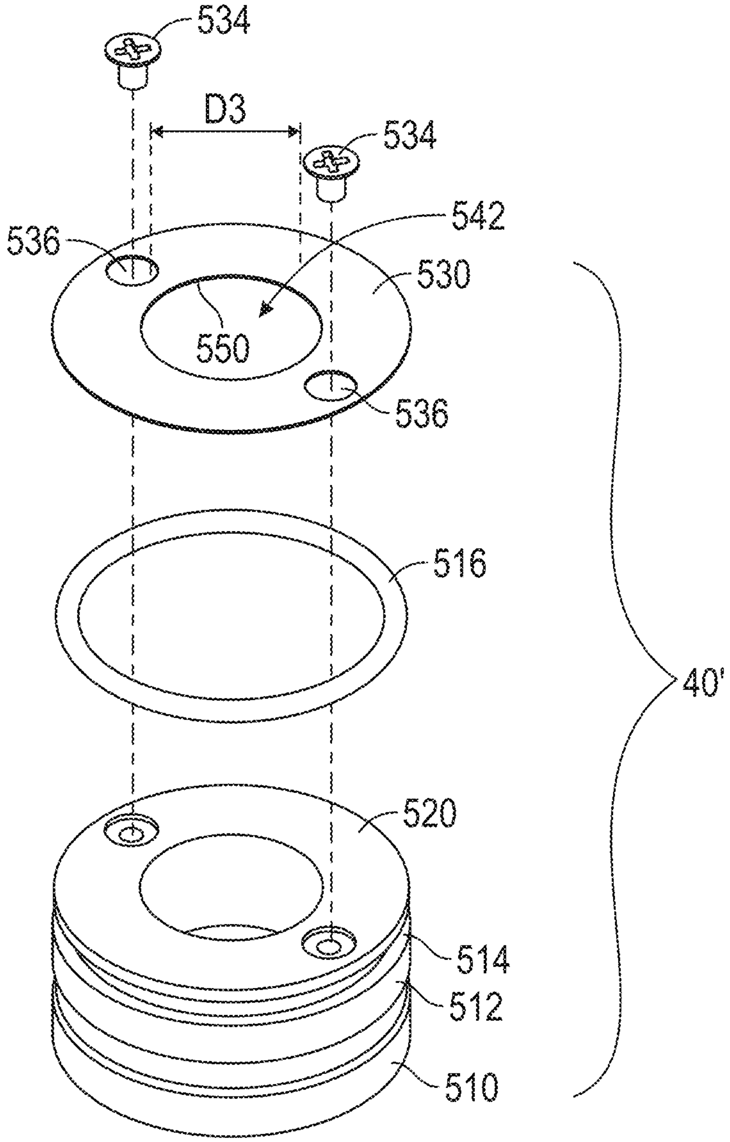
FIG. 5A is an exploded view of a second example of a baffle.
Figure 5B:
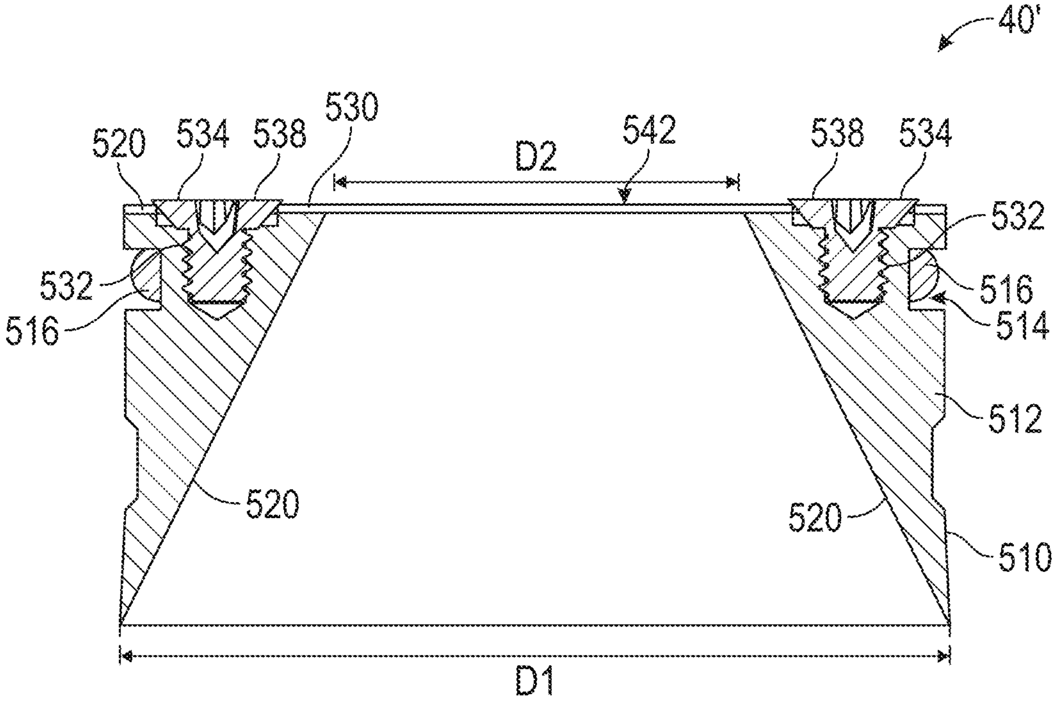
FIG. 5B is a cross-sectional view of the baffle of FIG. 5A.
Figure 5C:
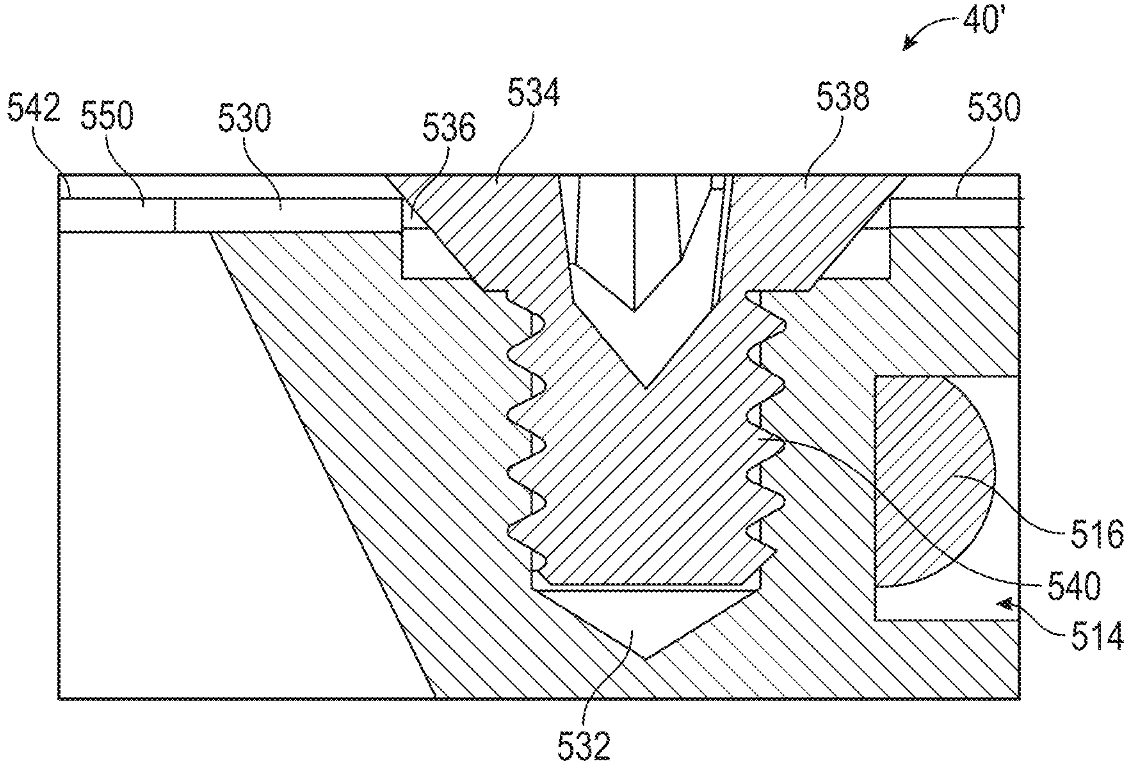
FIG. 5C is an enlarged view of a fastener holding a glare mask to a baffle.

Referring now to FIGS. 5A-5C, the baffle assembly 40' is illustrated in further detail. The baffle assembly 40' includes a baffle 510 that includes axially extending walls 512. The axially extending walls 512 may include a seal channel 514. The seal channel 514 receives a seal such as an O ring 516. The O ring 516 allows an interference fit for the baffle 510 when assembled within the light fixture assembly 10. As is best illustrated in FIG. 5B, the axially extending walls 512 may have an angled portion that is tapered from a first diameter $D_1$ to a second $D_2$. That is, the first diameter $D_1$ is greater than the second diameter $D_2$. That is, the second diameter $D_2$ is located inward relative to the light fixture assembly 10.

The baffle 510 includes a first end 520 that is generally planar and circular in shape. The first end 520 is disposed inward relative to the light fixture carriage 22. A glare mask 530 is disposed adjacent to the first end 520. The first end 520 may have fastener channels 532 disposed therein. The fastener channels 532 receive fasteners 534. In the present example, two fasteners 534 and two fastener channels 532 are provided. However, a greater number or lesser number of fasteners 534 and fastener channels 532 may be provided. Openings 536 through the glare mask 530 receive the fasteners 534. The fasteners 534 are received within the openings 536 and the fastener channels 532 and provide a force to secure the glare mask 530 to the first end 520 of the baffle 510. In the present example, the head 538 of the fasteners 534 are nearly coplanar or recessed within the glare mask 530. As illustrated in FIG. 50, the first end of the head 538 may be positioned just outward from the glare mask 530. The glare mask 530 has a light aperture diameter $D_3$ that is less than the diameter $D_2$ of the baffle 510. The fastener 534 is a screw having threads 540.

A glare mask aperture wall 550 is best illustrated in FIG. 5C. The glare mask aperture wall 550 and/or the entire glare mask 530 may be painted a material matte black to reduce the amount of glare reflecting therefrom. The glare mask aperture 550 defines a light aperture 542. As described above, the aperture 542 has the diameter $D_2$ to help reduce glare.

Figure 5D:
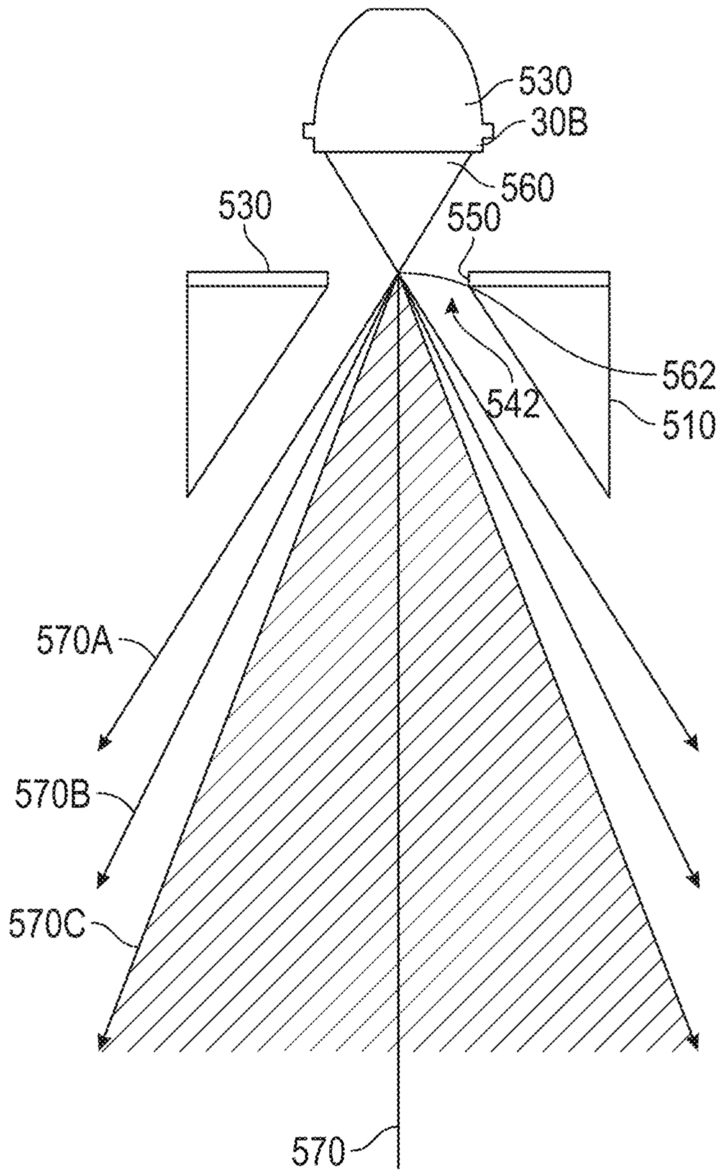
FIG. 5D is a view of light rays from a light engine assembly relative to the glare mask of FIGS. 5A-5C.

Referring now to FIG. 5D, the light engine assembly 30 is illustrated generating a light beam 560. The light beam 560 is focused by optics 30B at a focal point 562. The focal point 562 may be directly adjacent or within the wall thickness. In the previous example illustrated in FIGS. 4A and 4B, the light aperture wall 444 may have the focal point therebetween as well. That is, in both cases, the focal point may be between the upper surface of the glare mask and the lowermost surface of the glare mask. A lowermost surface of the glare mask 530 in FIG. 4B is the bottom edge of the light aperture wall 444.

The glare mask 530 allow light at various angles 570 to be generated. In this example, angle 570A corresponds to 40°, angle 570B corresponds to 30° and angle 570C corresponds to 20° from a normal 572.

Referring now to FIGS. 6A-6E, the appliqué 36 is illustrated in greater detail below. The appliqué 36 as mentioned above has the receiver 36A, the planar portion 36B and perforations 36C. In this example, the receiver 36A is generally square although other shapes may be used. The perforations 36C allow finishing material 604 such as drywall mud or plaster to be received therein to hold the appliqué 36 directly against the ceiling 606. The finishing material 604 is typically brittle when dry. The finishing material 604 may also include paint. The material of the baffle 42 is flexible so that for removal, pressure or a sharp force allows the finishing material to break.

Figure 6B:
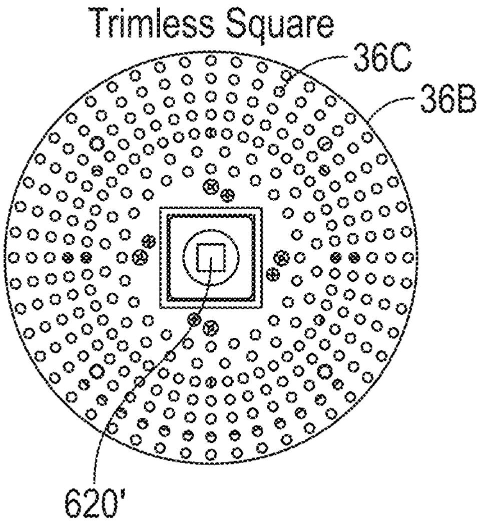
FIG. 6B is the appliqué of FIG. 6A having another example of a baffle disposed therein.

As is best illustrated in FIG. 6B, the baffle 42 is received within the receiver 36A. The receiver 36A has walls 610. The receiver 36A receives the baffle 42. The baffle 42 is prevented from moving further in an axial direction by the flange 614.

Figure 6C:
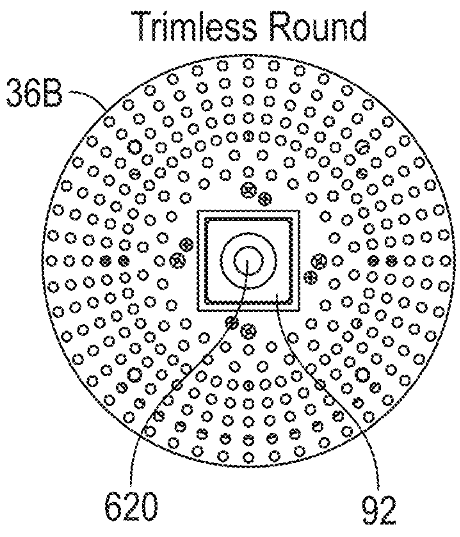
FIG. 6C is an example of a flexible baffle within the appliqué having a round light aperture.
Figure 6D:
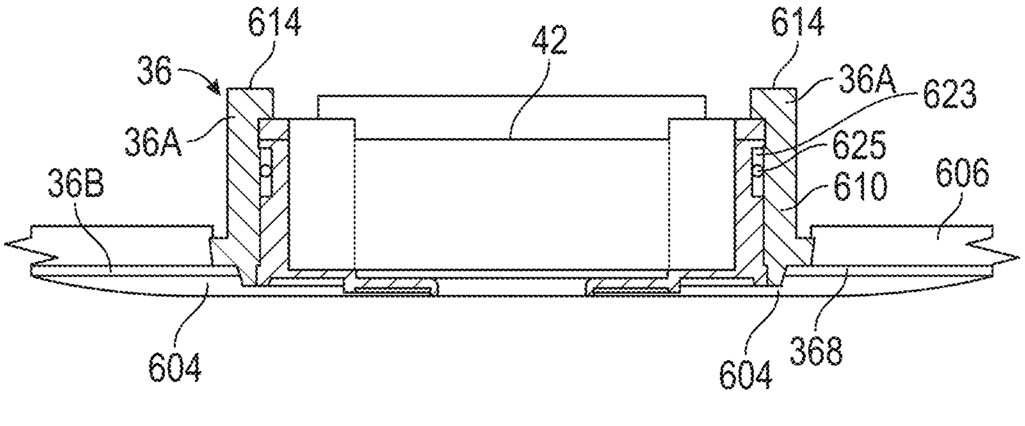
FIG. 6D is an example of a flexible baffle within the appliqué having a square light aperture.

Referring now to FIG. 6C, details of the baffle 42 are illustrated. In this example, a first baffle 42 has a light aperture 620 that is round. In FIG. 6D, the aperture 620' is square. Of course, other shapes of apertures may be used. Likewise, other shapes of the baffle 42 may also be provided.

Figure 6E:
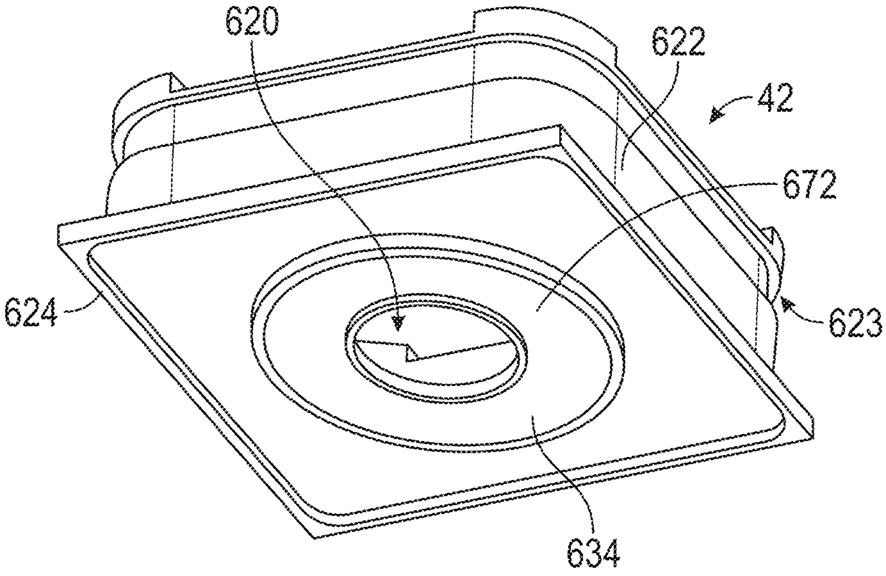
FIG. 6E is a perspective of the baffle of FIG. 6D.
Figure 6F:
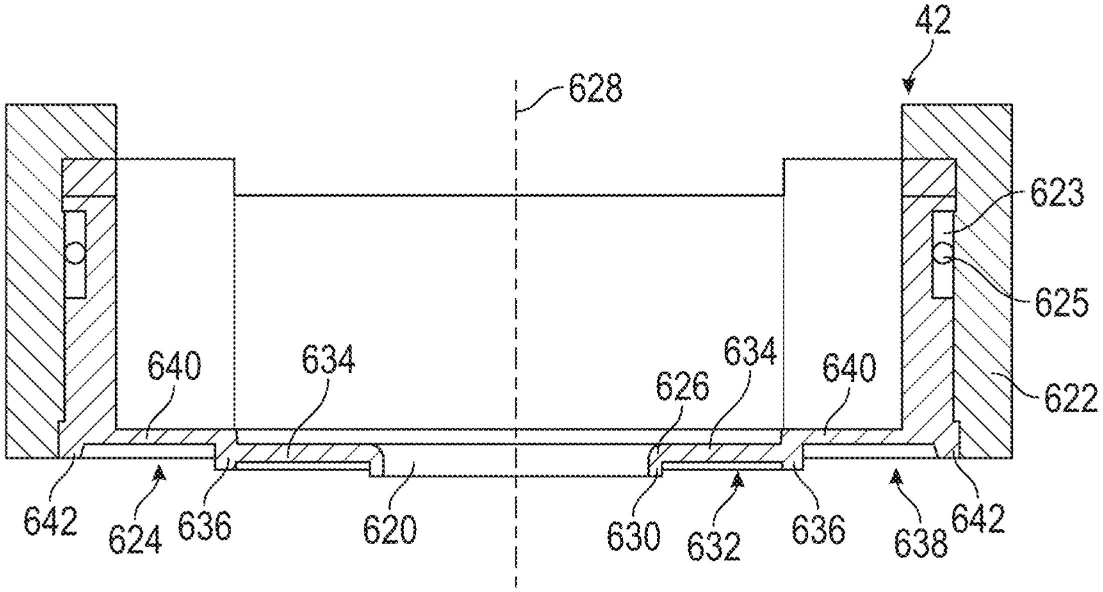
FIG. 6F is a cross-sectional view of the baffle of FIG. 6E.

Referring now to FIGS. 6E and 6F, details of the baffle 42 are provided. The baffle 42 may be formed of flexible material to allow plaster or drywall mud to crack upon banging on the plaster or drywall mud to remove the baffle 42. As mentioned above, the baffle 42 is received within an interior volume of the receiver 36A. In fact, the baffle 42 has at least one perimeter wall 622 extending therearound. The perimeter wall 622 in this example is generally square in shape and therefore four exterior walls are formed. However, other shapes of the baffle 42 may be provided. The perimeter walls 622 may include a seal channel 623 that extend thereinto. The seal channel 623 receives a seal or O ring 625. The O ring 625 allows the baffle 42 to be secured within the receiver 36A. The baffle perimeter wall 622 is coupled to a cover wall 624. The cover wall 624 extends between the perimeter wall 622 or perimeter walls 622 should there be more than one perimeter wall in a shape other than a circle. The cover wall 624 has the light aperture 620 extending therethrough. The light aperture 620 is defined by at least aperture wall 626 that is axially extending to the axis 628. The aperture wall 626 may be formed of a single wall when a round aperture 620 is used. However, when a square aperture 620', such as that illustrated in FIG. 6D is used, four walls may be provided. However, other shapes of apertures 620, 620' may be used.

The aperture wall 626 forms an outer edge 630. The outer edge extends axially from the cover wall. The outer edge 630 and the aperture wall 626 define a first finishing material receiver channel 632 that extends around and may be concentric with the light aperture 620. A first planar wall 634 is used to define the first finishing material receiver channel 632. The first planar wall 634 is disposed in a plane inward from the plane of the outer edge 630. A first axially extending wall 636 finishes the definition of the finish material receiver channel 632. The axially extending channel wall 636 defines a second finish material receiver channel 638 that may be concentric with the first finishing material receiver channel 632. The second finish material receiver channel 638 has a planar wall 640 that is used for receiving drywall mud or plaster. A second axially extending wall 642 defines the outer boundary of the second finish material receiver channel 638. The second planar wall 640 is on a third plane that is axially inward from the first plane of the first wall 634 and the inward from the outer edge 630 of the light aperture 620. By providing different planes a tapered finished surface of finishing material may be provided.

Figure 7:
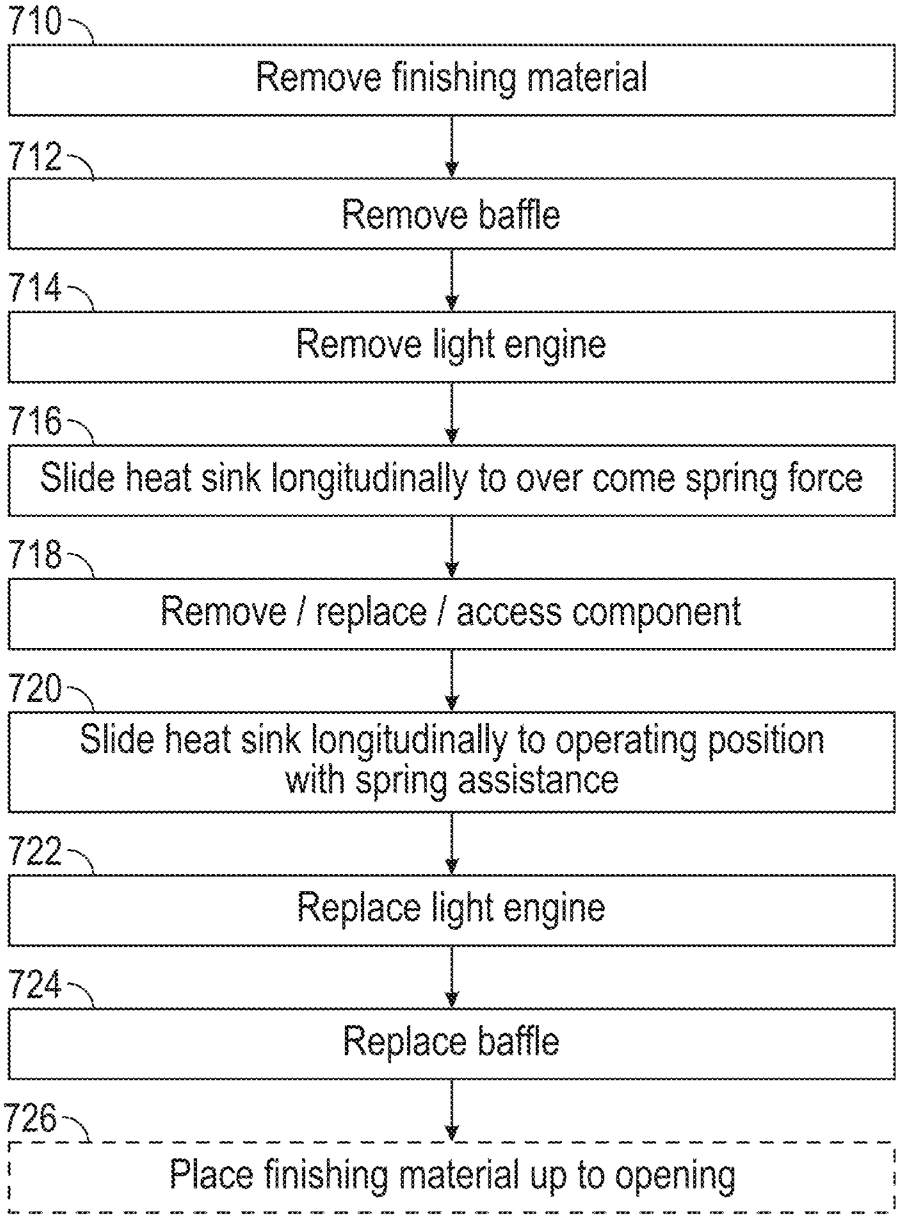
FIG. 7 is a flowchart of a method relative to the light fixture assembly 10.

Referring now to FIG. 7, a method for operating or using the light fixture is set forth. In step 710, the optional step of removing the finishing material such as mud or plaster from the baffle may be performed when the baffle illustrated in FIGS. 6A-6F are used. Force may be applied to the area over the baffle 42 to break the finishing material that are disposed within the channel 632 and 638. A finish surface such as that illustrated in FIG. 1A may have been provided by the baffle 42. When another baffle, such as the baffle assembly 40 and 40' are provided, the mud or plaster does not need to be removed in step 710. Therefore, step 710 is an optional step.

In step 712, the baffle of the light fixture assembly is removed. The baffle 42 is removed by pulling the baffle in an axial direction relative to the baffle. In step 714, the light engine assembly may be removed. Should the light engine assembly need replacing, the light engine assembly may be replaced. In step 716, the heat sink may be slid in a longitudinal direction relative to the light fixture assembly in the carriage 22. The spring force may be overcome in step 712 in a vertical and a horizontal direction. In step 718, the component within the light fixture assembly 10 that needs replacing or adjusting may be accessed through the opening left by the baffles. As mentioned above, the sensor assembly 50 or another type of component such as a power supply component, switches or the like may be replaced, accessed or removed in step 718.

In step 720, the heat sink assembly is slid longitudinally to its operating position with the assistance of the spring. As mentioned above, when the force is provided to position the heat sink back over the opening, the spring force, due to the shape of the spring, may provide additional force to push the heat sink into the proper position. As mentioned above, the light engine assembly 722 may be replaced instead of replacing the light or repositioning the light engine assembly therein. In step 724, the baffle may be replaced. In the baffle 42, illustrated in FIGS. 6E and 6F, mud may be applied up to the opening and into the channels 632 and 638 in step 726.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the term first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A light fixture assembly comprising:

a carriage comprising a first side wall having a first opening therethrough, and a second side wall disposed opposite and spaced from the first side wall;

a light assembly disposed at least partially within and coupled to the carriage, said light assembly comprising a heat sink;

the heat sink comprising a spring channel; and a spring fixedly coupled to the second side wall extending between the second side wall and the light assembly, the spring at least partially disposed in the spring channel and partially compressed by the heat sink while allowing horizontal and vertical movement of at least a portion of the heat sink.

2. The light fixture assembly of claim 1 wherein the first side wall comprises a bottom side wall and the second side wall comprises a top side wall.

3. The light fixture assembly of claim 2 wherein the spring comprises a first end coupled to the top side wall and a second end spaced apart from the second end coupled to the top side wall.

4. The light fixture assembly of claim 3 wherein the first end comprises a first mounting flange and the second end comprises a second mounting flange.

5. The light fixture assembly of claim 4 wherein the first mounting flange and the second mounting flange are coupled to the top side wall by fasteners.

6. The light fixture assembly of claim 5 wherein the first mounting flange comprise a first laterally extending wall extending therefrom and the second mounting flange comprises a second laterally extending wall extending therefrom.

7. The light fixture assembly of claim 6 wherein the first laterally extending wall and the second laterally extending wall comprises a first spring band and a second spring band of the spring extending therebetween.

8. The light fixture assembly of claim 7 wherein the first spring band and the second spring band are compressed by the heat sink when the light assembly is assembled within the carriage.

9. The light fixture assembly of claim 8 wherein the first spring band and the second spring band comprise at least an inch long portion contacting the heat sink.

10. The light fixture assembly of claim 9 wherein the first spring band and the second spring band are compressed by the heat sink of the light assembly when the light assembly is assembled within the carriage.

11. The light fixture assembly of claim 10 wherein the first spring band and the second spring band are disposed in channels of the heat sink.

12. The light fixture assembly of claim 10 wherein the first spring band and the second spring band are disposed in longitudinally extending channels of the heat sink.

13. A light fixture assembly comprising:

a carriage comprising a first side wall having a first opening therethrough, and a second side wall disposed opposite and spaced from the first side wall;

a light assembly disposed at least partially within and coupled to the first side wall of the carriage, the light assembly comprising a heat sink; and a spring comprising a first laterally extending wall fixedly coupled to the second side wall and a second laterally extending wall coupled to the second side wall spaced apart from the first laterally extending wall, the spring comprising a first spring band and a second spring band spaced apart from the first spring band and extending between the first laterally extending wall and the second laterally extending wall, the first spring band and the second spring band partially compressed by the heat sink while allowing horizontal and vertical movement of the heat sink.

14. The light fixture assembly of claim 13 wherein the heat sink comprises a plurality of channels, the first spring band received in a first channel of the plurality of channels and the second spring band is received in a second channel of the plurality of channels.

15. The light fixture assembly of claim 14 wherein the first channel and the second channel a longitudinally extending.

16. The light fixture assembly of claim 14 wherein the second side wall comprises a top side wall and further comprising fasteners coupling the first laterally extending wall and the second laterally extending wall to the top side wall.

17. The light fixture assembly of claim 14 wherein the first laterally extending wall, the second laterally extending wall, the first spring band and the second spring band are monolithic.

18. A method for forming a light fixture assembly having a carriage comprising at least a first side wall spaced apart from a second side wall comprising:

providing a spring comprising a first laterally extending wall fixedly coupled to the second side wall and a second laterally extending wall coupled to the second side wall spaced apart from the first laterally extending wall, the spring comprising a first spring band and a second spring band spaced apart from the first spring band and extending between the first laterally extending wall and the second laterally extending wall;

receiving at least a portion of the first spring band and the second spring band within respective spring channels of a heat sink;

partially compressing the first spring band and the second spring band by the heat sink;

thermally coupling a light engine assembly to the heat sink, the heat sink at least partially disposed within the carriage; and coupling a baffle to the light fixture assembly.

19. The method of claim 18 further comprising removing a baffle from the carriage; and moving the heat sink with a horizontal and vertical movement within the carriage against a spring force provided by the first spring band and the second spring band.

20. The method of claim 18 further comprising coupling a glare mask adjacent to the baffle or providing the baffle formed of a flexible material.

* * * * *